(12) United States Patent
Xiong

(10) Patent No.: US 10,797,518 B2
(45) Date of Patent: Oct. 6, 2020

(54) ADAPTIVE SCALABLE WIRELESS CHARGING MODULE WITH FREE POSITIONING

(71) Applicant: FLYN'BUY, INC., San Jose, CA (US)

(72) Inventor: Ying Xiong, San Diego, CA (US)

(*) Notice: Subject to any disclaimer, the term of this patent is extended or adjusted under 35 U.S.C. 154(b) by 163 days.

(21) Appl. No.: 16/012,409

(22) Filed: Jun. 19, 2018

(65) Prior Publication Data

US 2019/0386512 A1    Dec. 19, 2019

(51) Int. Cl.
| | |
|---|---|
| *H02J 50/10* | (2016.01) |
| *H01F 38/14* | (2006.01) |
| *H02J 7/02* | (2016.01) |
| *H02J 50/80* | (2016.01) |
| *H02J 50/50* | (2016.01) |

(52) U.S. Cl.
CPC .............. *H02J 50/10* (2016.02); *H01F 38/14* (2013.01); *H02J 7/025* (2013.01); *H02J 50/50* (2016.02); *H02J 50/80* (2016.02)

(58) Field of Classification Search
CPC .. H02J 50/10; H02J 50/50; H02J 50/80; H02J 7/025; H02J 17/00; H01F 38/14; H04B 5/0037
USPC ........................................................ 307/104
See application file for complete search history.

(56) References Cited

U.S. PATENT DOCUMENTS

| | | | |
|---|---|---|---|
| 2012/0049991 A1* | 3/2012 | Baarman ................. | H02J 7/025 336/199 |
| 2018/0091000 A1* | 3/2018 | Jol .......................... | H02J 50/10 |
| 2019/0027298 A1* | 1/2019 | Jadidian .............. | H01F 27/2885 |

* cited by examiner

*Primary Examiner* — Hal Kaplan
(74) *Attorney, Agent, or Firm* — TDFoster

(57) ABSTRACT

A wireless charging resource includes: processing elements; insulating elements; and coils, where the processing elements, insulating elements, and coils are arranged in a repeating array. A method of wireless charging includes: sending, from a charging resource, an analog ping to identify charging coils associated with a charging receiver; sending a digital ping to identify optimal charging coils; and activating the optimal charging coils in order to provide charging power to the charging receiver. A method of generating a layout for a wireless charging transmitter includes: determining an available area; calculating a number of coils to be included in an array; arranging a first set of coils including the number of coils on a first coil layer; arranging a second set of coils including the number of coils on a second coil layer; and arranging a third set of coils including the number of coils on a third coil layer.

17 Claims, 16 Drawing Sheets

ADAPTIVE SCALABLE WIRELESS CHARGING MODULE WITH FREE POSITIONING

BACKGROUND

Many devices, such as smartphones, tablets, wearable devices, etc. utilize wireless (or "inductive") charging, where a charging pad or similar device supplies charging energy to a user device without requiring any wired connections.

Existing solutions require exact positioning and orientation of a device in order to ensure that charging is activated and/or efficient.

In addition, existing solutions require dedicated chargers for different devices due to varying power handling capabilities of the devices being charged.

Furthermore, existing solutions consume extensive time in generating a charger-specific layout for a charging transmitter.

Therefore there exists a need for a scalable wireless charging solution that allows free positioning and is able to supply various devices with various power handling capabilities.

SUMMARY

Some embodiments may provide a wireless charging resource. The wireless charging resource may include a transmitter that is able to transfer power to a user device having a charging receiver.

The transmitter may include multiple modules distributed across multiple layers.

Such modules may include a processing module, an insulating module, and a coils module. The coils module may include multiple layers of coils.

The transmitter may include an array of interlocking sections, where each section includes the various modules described above. Such sections may be coupled together to generate larger transmitter areas. In this way, a section layout may be reused to scale to any size transmitter area.

The charging resource may utilize multiple coil sets in order to provide free positioning of the user device. Such coil sets may include coils across multiple layers (e.g., bottom, middle, and top). The charging resource may evaluate multiple coil sets and, based on feedback from the user device, select one or more optimal coil sets.

Some embodiments may adjust charging parameters based on feedback from the user device. Such parameters may include, for instance, voltage, frequency, duty cycle, and/or phase shift. Such adjustments may include, for instance, varying charging power from a low starting value until a maximum charging power for a particular device is identified. In this way, devices with varying charging capabilities may all be efficiently charged without damage.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims.

However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide an adaptive scalable wireless charging resource with free positioning.

A first exemplary embodiment provides a wireless charging resource comprising: a plurality of processing elements; a plurality of insulating elements; and a plurality of coils, wherein the processing elements, insulating elements, and coils are arranged in a repeating array.

A second exemplary embodiment provides a method of performing wireless charging, the method comprising: sending, from a charging resource, an analog ping to identify a list of charging coils associated with a charging receiver; sending, from the charging resource, a digital ping to identify a set of optimal charging coils; and activating the set of optimal charging coils in order to provide charging power to the charging receiver.

A third exemplary embodiment provides a method of generating a layout for a wireless charging transmitter, the method comprising: determining an available transmitter area; calculating a number of coils to be included in an array; arranging a first set of coils including the number of coils on a first coil layer; arranging a second set of coils including the number of coils on a second coil layer; and arranging a third set of coils including the number of coils on a third coil layer.

Several more detailed embodiments are described in the sections below. Section I provides a description of an exemplary system architecture of some embodiments. Section II then describes an exemplary transmitter architecture of some embodiments. Next, Section III describes methods of operation used by some embodiments. Lastly, Section IV describes a computer system which implements some of the embodiments.

I. System Architecture

Figure 1:
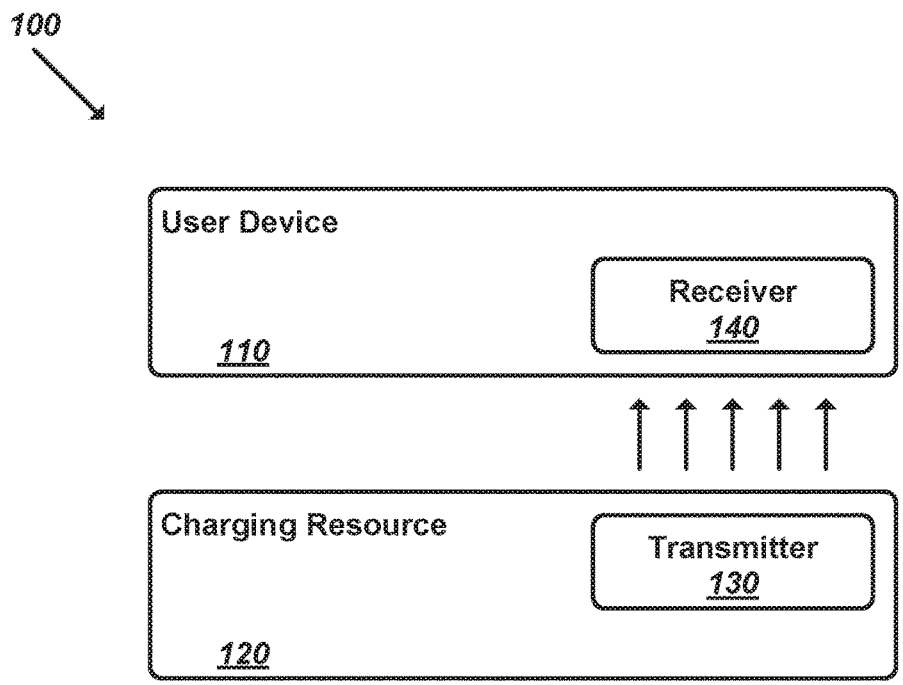
FIG. 1 illustrates a schematic block diagram of wireless charging system according to an exemplary embodiment.

FIG. 1 illustrates a schematic block diagram of wireless charging system 100 according to an exemplary embodiment. As shown, the system may include a user device 110 and a charging resource 120 of some embodiments.

The user device 110 may include a wireless charging receiver 140. The user device 110 may be a device such as a smartphone, tablet, personal computer, wearable device, etc. The receiver 140 may include coils or similar structures that are able to convert wireless signals into charging power.

The charging resource 120 may include a wireless charging transmitter 130. The charging resource 120 may be an electronic device provided in various appropriate form factors (e.g., charging pad, charging station, multi-use power dock, etc.). One example transmitter 130 will be described in reference to FIG. 2 below.

The elements of system 100 may operate using the Qi open interface standard and/or other appropriate protocols, standards, etc.

Figure 2:
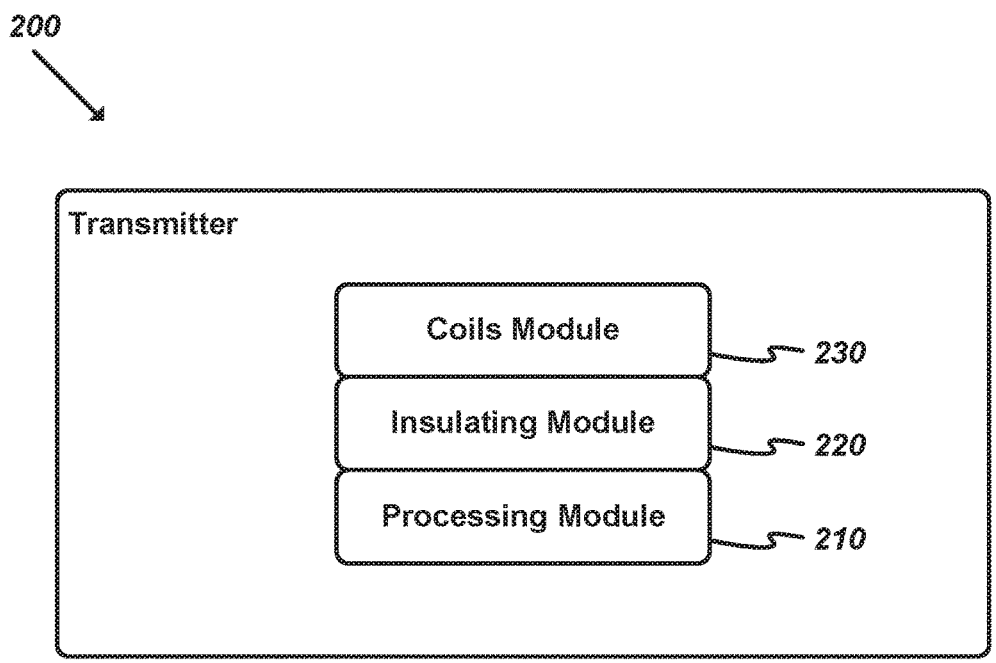
FIG. 2 illustrates a schematic block diagram of a transmitter included in the system of FIG. 1.

FIG. 2 illustrates a schematic block diagram of a transmitter 200 included in the system 100. The exemplary transmitter 200 is one example of a transmitter that may serve as transmitter 130. As shown, transmitter 200 may include a processing module 210, an insulating module 220, and a coils module 230.

The processing module 210 may include coil drivers and various controllers (e.g., micro controllers). In some embodiments, the processing module may be implemented using multiple-layers of printed circuit boards (PCBs) in order to match the size of other associated elements (e.g., the coils module). The processing module may include multiple processing elements that are arranged in a repeating array.

The insulating module 220 may shield the processing module 210 from the magnetic fields generated by the coils module 230. The insulating module may include ferrite and/or other appropriate materials. The insulating module may include multiple insulating elements that are arranged in a repeating array.

The coils module 230 may include multiple layers of coils in an arrangement that provides full charging coverage of the entire charging area. The coils module may include multiple coils across the multiple layers that are arranged in a repeating array.

Exemplary layouts are described in Section II below.

One of ordinary skill in the art will recognize that the charging resource 120 and transmitter 130 or 200 may be implemented in various different ways without departing from the scope of the disclosure. For instance, the charging resource may include multiple transmitters. As another example, the transmitter may include additional modules and/or omit various modules. Different embodiments may be arranged in different ways. The size and/or shape of the elements may vary in different ways.

II. Physical Architecture

Figure 3:
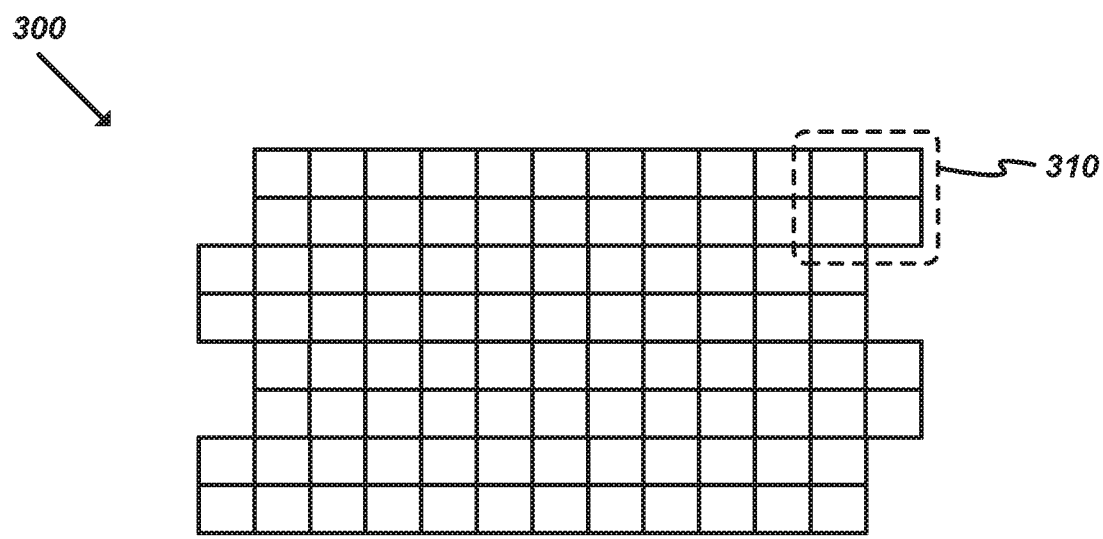
FIG. 3 illustrates a top plan view of a processing layer included in the transmitter of FIG. 2.

FIG. 3 illustrates a top plan view of a section of a processing layer 300 included in the transmitter 200. The processing layer 300 may include components described above in reference to the processing module 210.

The processing layer 300 may be laid out such that the other transmitter elements are able to be aligned to the processing layer. In this example, the processing layer includes repeating sections 310. Different embodiments may include differently sized and/or shaped sections. In some embodiments, the processing layer 300 may include multiple PCB layers. The processing layer may include various connection points or wires (not shown).

Figure 4:
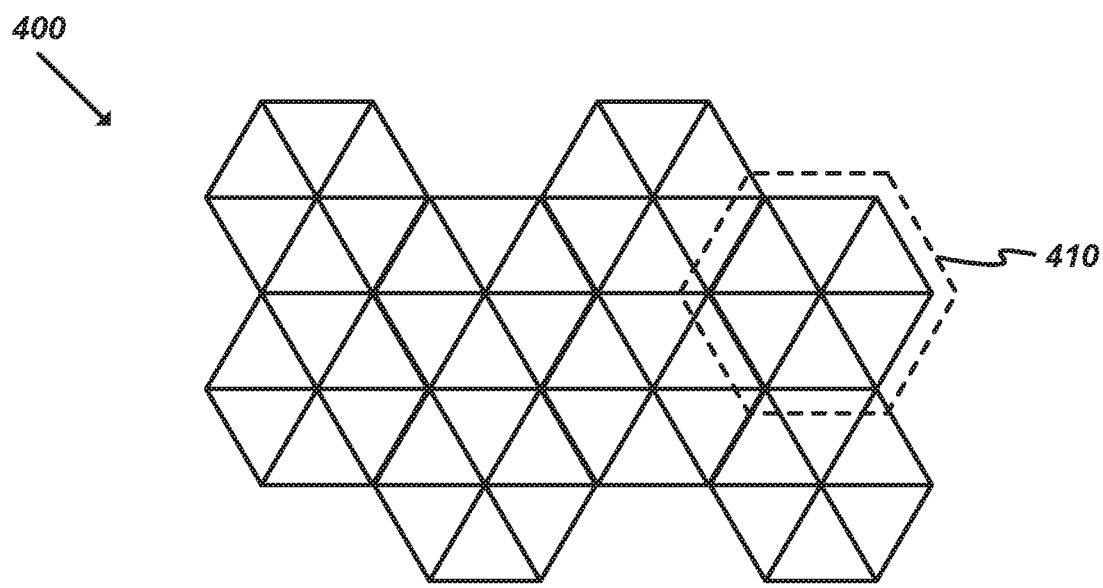
FIG. 4 illustrates a top plan view of an insulating layer included in the transmitter of FIG. 2.

FIG. 4 illustrates a top plan view of a section of an insulating layer 400 included in the transmitter 200. The insulating layer 400 may include components described above in reference to the insulating module 220. The insulating layer may include ferrite and/or other appropriate materials that are able to block and/or absorb electromagnetic energy.

The insulating layer 400 may be laid out such that the other transmitter elements are able to be aligned to the insulating layer. In this example, the insulating layer 400 includes repeating sections 410. The insulating layer may include various connection points or wires (not shown).

Figure 5:
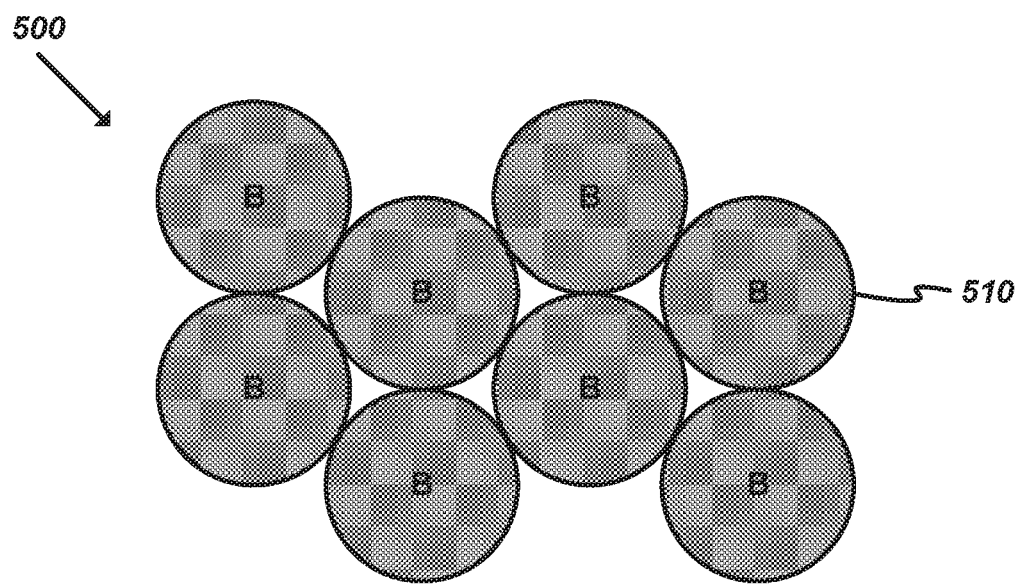
FIG. 5 illustrates a top plan view of a first layer of coils included in the transmitter of FIG. 2.

FIG. 5 illustrates a top plan view of a section of a first layer (or "bottom" layer) of coils 500 included in the transmitter 200. The first layer of coils 500 may include components described above in reference to the coils module 230. The first layer of coils 500 may include metal and/or other appropriate materials that are arranged such that an oscillating supply is able to be converted into an electromagnetic field.

The first layer of coils 500 may be laid out such that the other transmitter elements are able to be aligned to the first layer of coils. In this example, the first layer of coils 500 includes repeating sections 510. The first layer of coils may include various connection points or wires (not shown).

Figure 6:
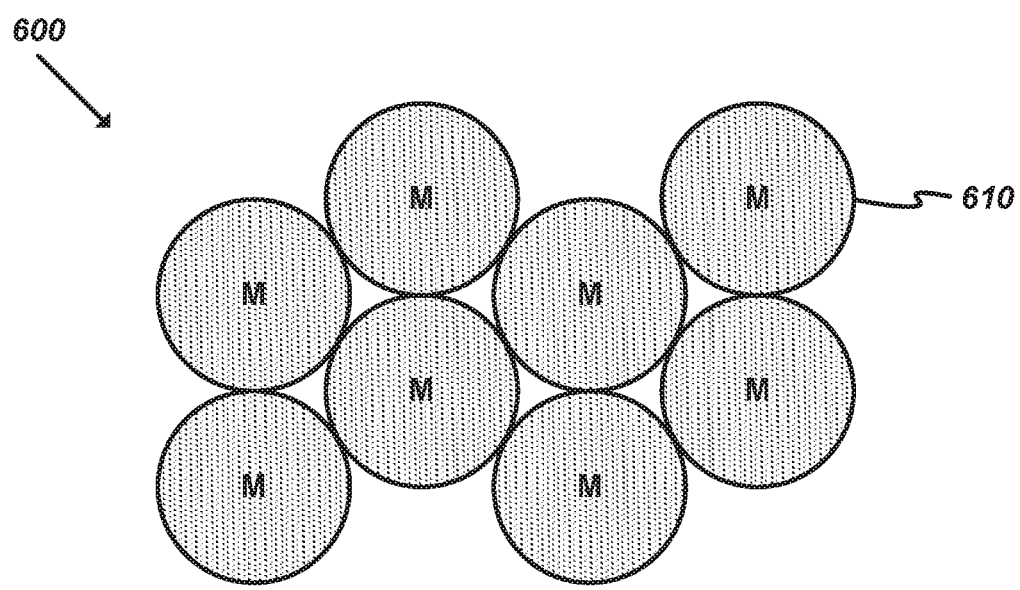
FIG. 6 illustrates a top plan view of a second layer of coils included in the transmitter of FIG. 2.

FIG. 6 illustrates a top plan view of a section of a second layer (or "middle" layer) of coils 600 included in the transmitter 200. The second layer of coils 600 may include components described above in reference to the coils module 230. The second layer of coils may include metal and/or other appropriate materials that are arranged such that an oscillating supply is able to be converted into an electromagnetic field.

The second layer of coils 600 may be laid out such that the other transmitter elements are able to be aligned to the second layer of coils. In this example, the second layer of coils 600 includes repeating sections 610. The second layer of coils may include various connection points or wires (not shown).

Figure 7:
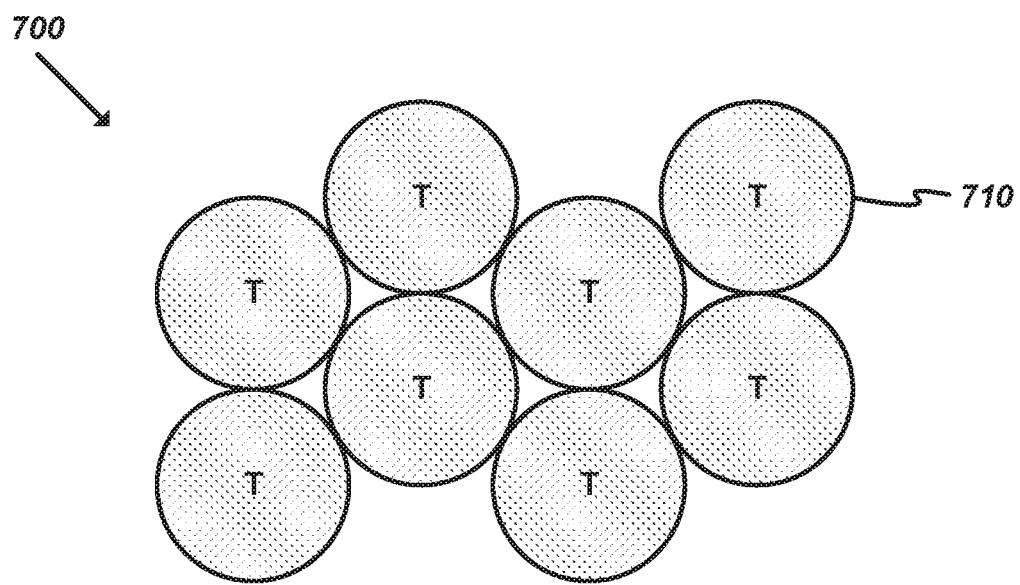
FIG. 7 illustrates a top plan view of a third layer of coils included in the transmitter of FIG. 2.

FIG. 7 illustrates a top plan view of a section of a third layer (or "top" layer) of coils 700 included in the transmitter 200. The third layer of coils 700 may include components described above in reference to the coils module 230. The third layer of coils may include metal and/or other appropriate materials that are arranged such that an oscillating supply is able to be converted into an electromagnetic field.

The third layer of coils 700 may be laid out such that the other transmitter elements are able to be aligned to the third layer of coils. In this example, the third layer of coils 700 includes repeating sections 710. The third layer of coils may include various connection points or wires (not shown).

Figure 8:
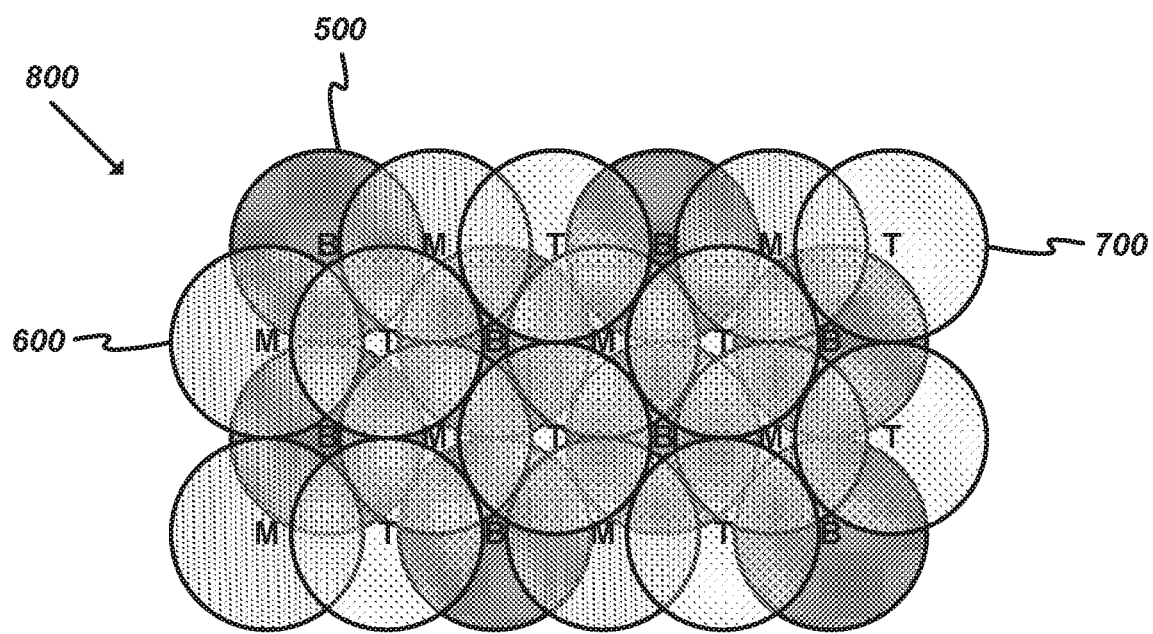
FIG. 8 illustrates a top plan view of the first, second, and third layers of coils included in the transmitter of FIG. 2.

FIG. 8 illustrates a top plan view of a section 800 of the first 500, second 600, and third 700 layers of coils included in the transmitter 200. As shown, the various layers form a partially overlapping pattern. In this example, the array (or "lattice") of coils 600 may be the same shape as array 700, offset by somewhat more than a radius of each coil along the x-axis. The three arrays 500, 600, and 700 may be arranged such that the top on bottom of each array is aligned along the y-axis.

Figure 9:
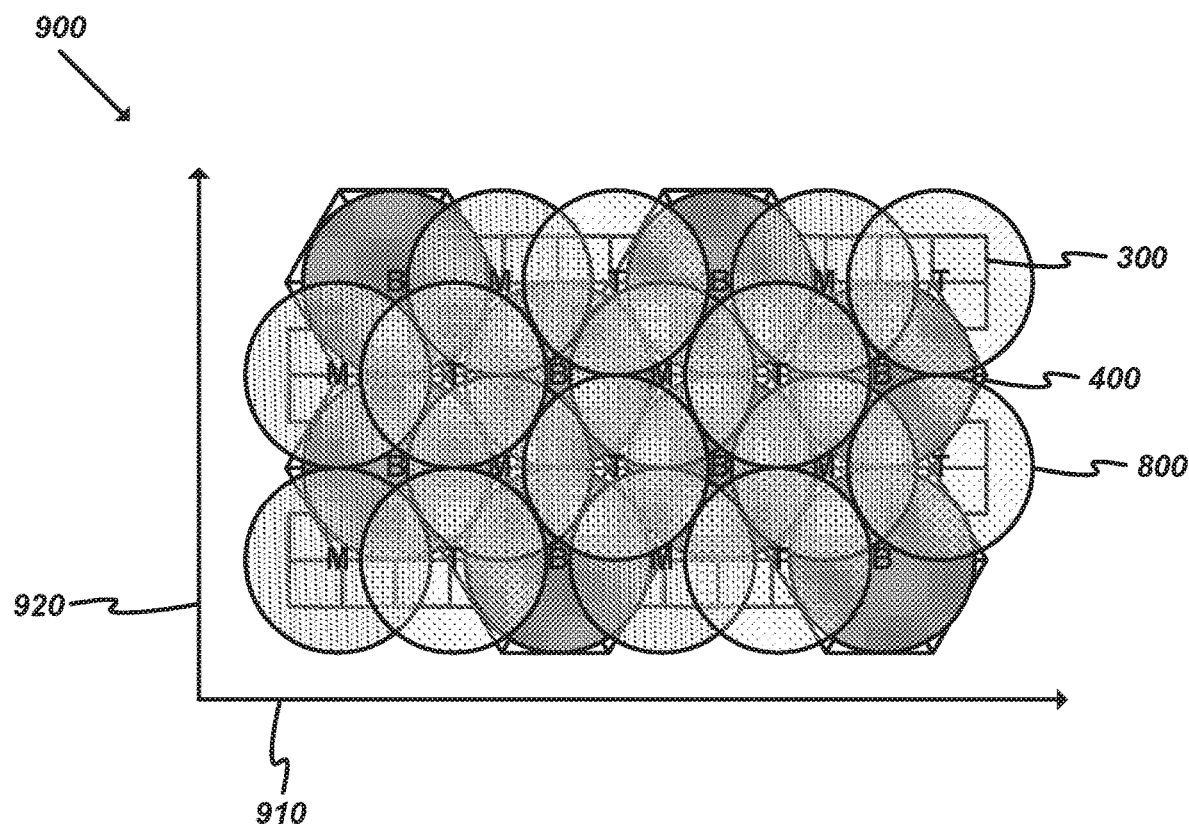
FIG. 9 illustrates a top plan view of the processing layer, insulating layer, and first, second, and third layers of coils included in the transmitter of FIG. 2.

FIG. 9 illustrates a top plan view of a section 900 of the processing layer 300, insulating layer 400, and first 500, second 600, and third 700 layers of coils included in the transmitter 200. As above, the various layers are aligned to form an overlapping pattern. In this example, the scalable section 900 is four by two (or two by one), in that each layer includes four coils along the x-axis 910 and two coils along the y-axis 920.

Figure 10:
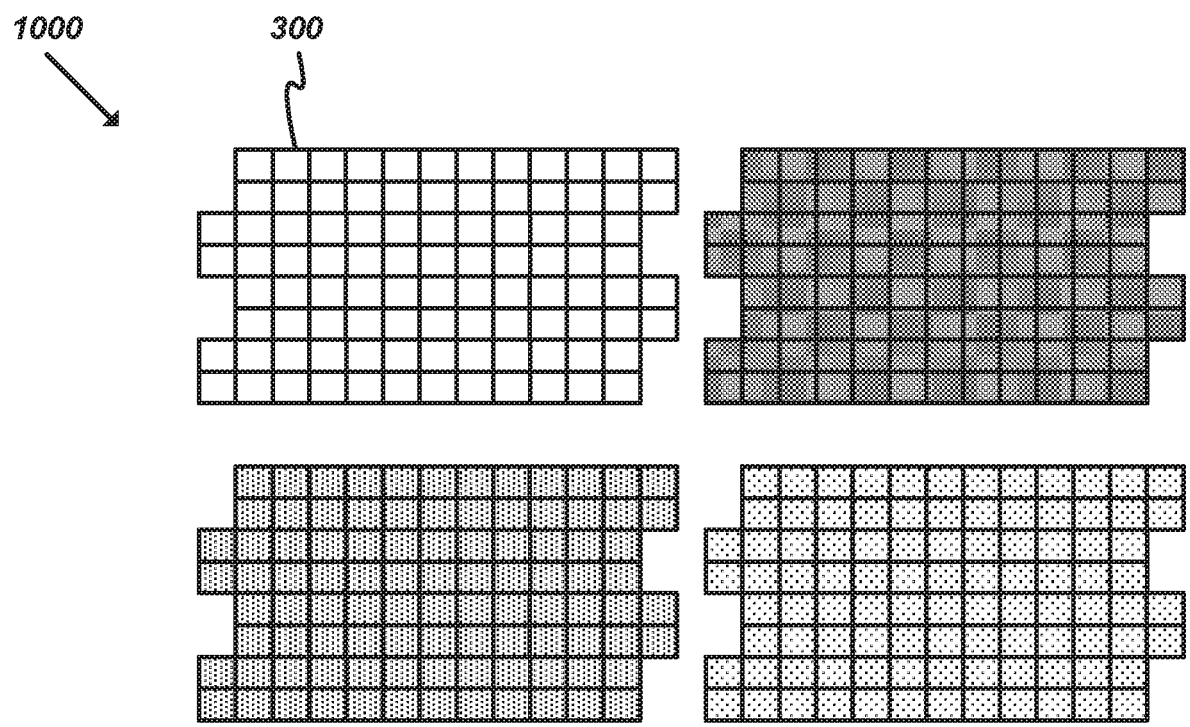
FIG. 10 illustrates a top plan view of a multiple tile arrangement of processing layers included in the transmitter of FIG. 2.
Figure 11:
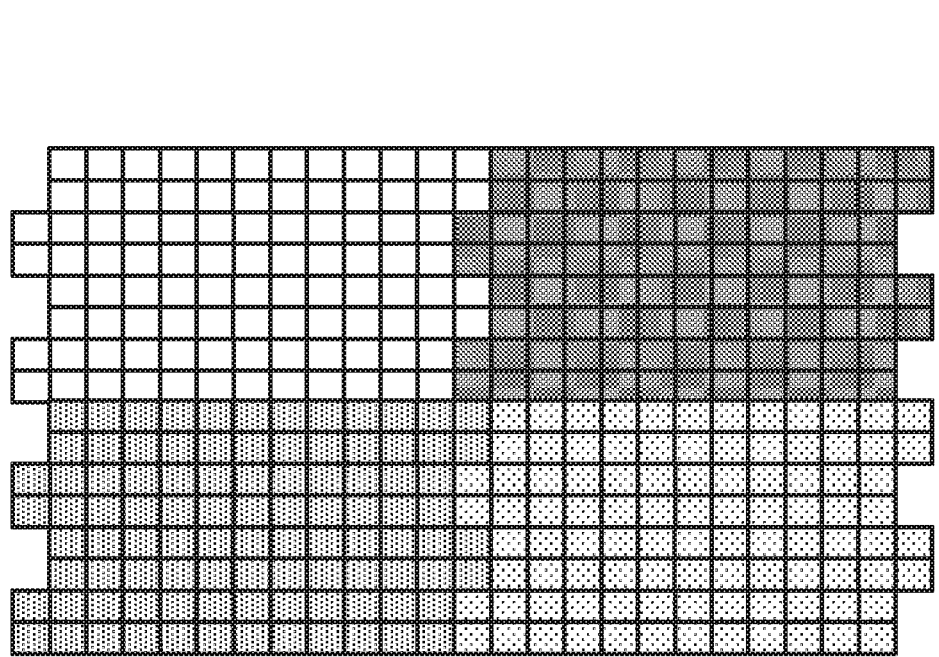
FIG. 11 illustrates a top plan view of the multiple tile arrangement of FIG. 10, as assembled.

FIG. 10 illustrates a top plan view of a multiple tile arrangement 1000 of processing layer sections 300 included in the transmitter 200. FIG. 11 illustrates a top plan view of the multiple tile arrangement 1100, as assembled. As shown, the sections 300 may fit together to cover larger areas. The sections are shaped such that the sections may be repeated in any direction to generate a repeating array that is able to cover any size area (larger than the section itself). Although the different sections have different fill patterns for clarity, the sections would be identical in an actual implementation.

Figure 12:
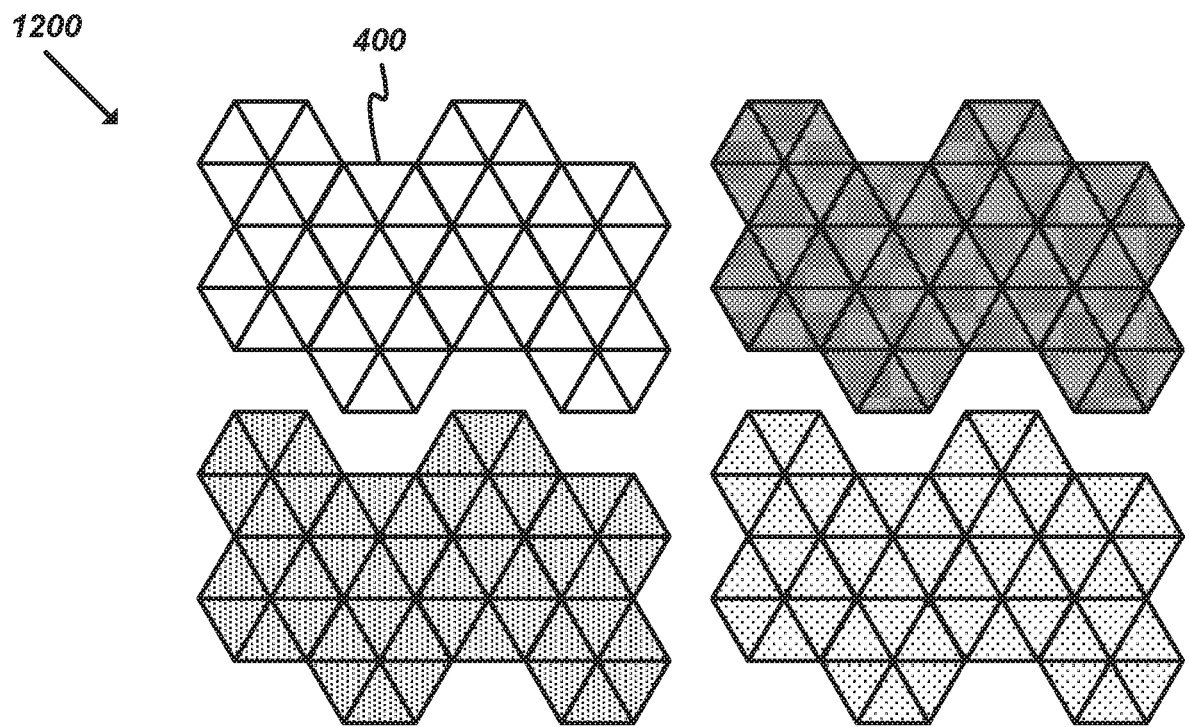
FIG. 12 illustrates a top plan view of a multiple tile arrangement of insulating layers included in the transmitter of FIG. 2.
Figure 13:
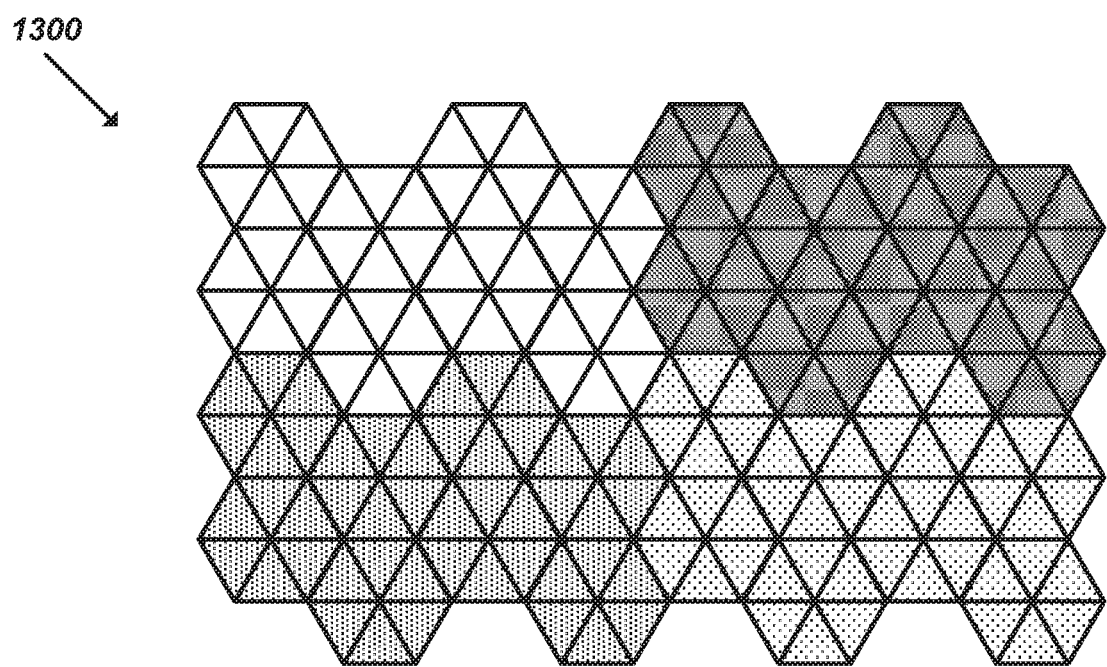
FIG. 13 illustrates a top plan view of the multiple tile arrangement of FIG. 12, as assembled.

FIG. 12 illustrates a top plan view of a multiple tile arrangement 1200 of insulating layer sections 400 included in the transmitter 200. FIG. 13 illustrates a top plan view of the multiple tile arrangement 1300, as assembled. As shown, the sections 400 may fit together to cover larger areas. The sections are shaped such that the sections may be repeated in any direction to cover any size area (larger than the section itself). Although the different sections have different fill patterns for clarity, the sections would be identical in an actual implementation.

Figure 14:
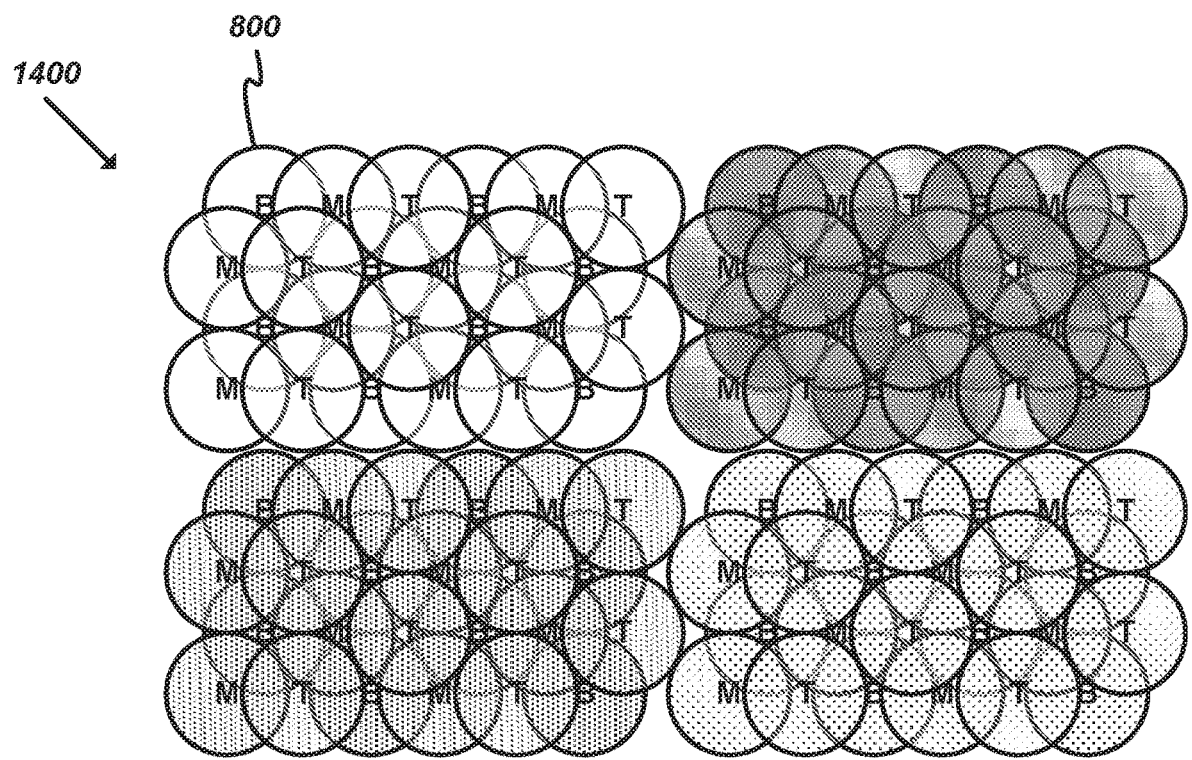
FIG. 14 illustrates a top plan view of a multiple tile arrangement of coil layers included in the transmitter of FIG. 2.
Figure 15:
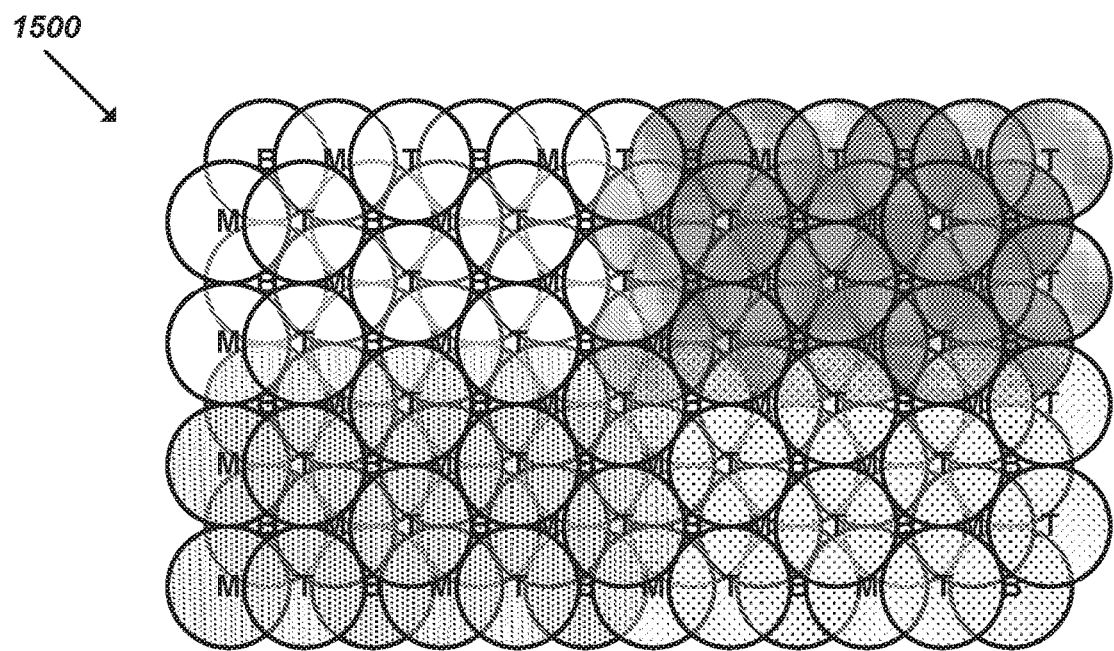
FIG. 15 illustrates a top plan view of the multiple tile arrangement of FIG. 14, as assembled.

FIG. 14 illustrates a top plan view of a multiple tile arrangement 1400 of coil layer sections 800 included in the transmitter 200. FIG. 15 illustrates a top plan view of the multiple tile arrangement 1500, as assembled. As shown, the sections 800 may fit together to cover larger areas. The sections are shaped such that the sections may be repeated in any direction to cover any size area (larger than the section itself). Although the different sections have different fill patterns for clarity, the sections would be identical in an actual implementation.

The various layer sections 500, 600, and 700 may be complementary in shape, layout, size, etc., such that combined sections of layers 800 may fit together to cover larger areas. The sections are shaped such that the sections may be repeated in any direction to cover any size area (larger than the section itself).

Figure 16:
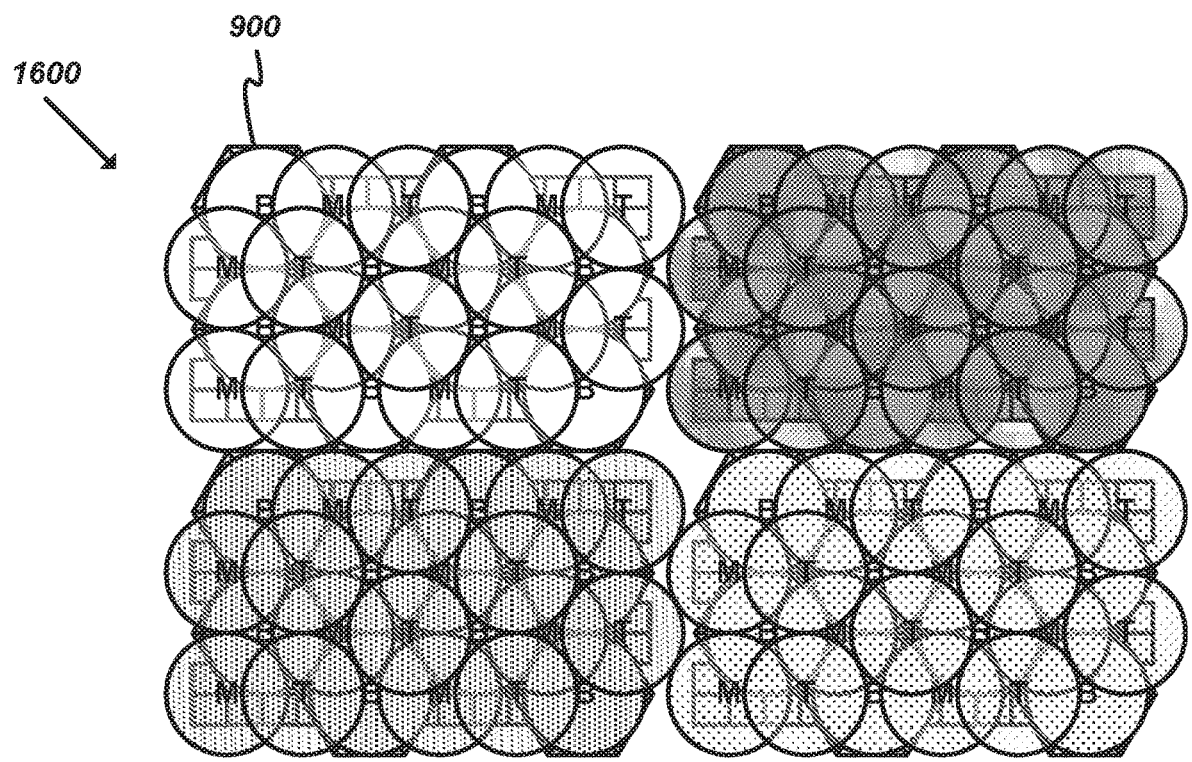
FIG. 16 illustrates a top plan view of a multiple tile arrangement of all layers included in the transmitter of FIG. 2.
Figure 17:
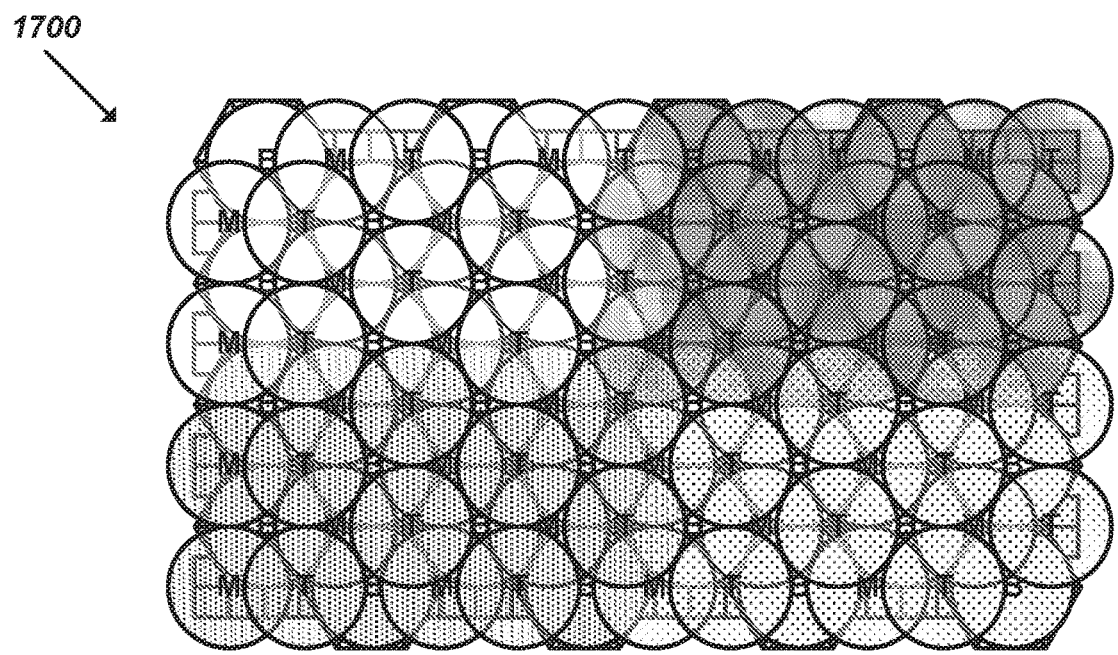
FIG. 17 illustrates a top plan view of the multiple tile arrangement of FIG. 16, as assembled.

FIG. 16 illustrates a top plan view of a multiple tile arrangement 1600 of all layer sections 900 included in the transmitter 200. FIG. 17 illustrates a top plan view of the multiple tile arrangement 1700, as assembled. As shown, the sections 900 may fit together to cover larger areas. The sections are shaped such that the sections may be repeated, or "snapped" together, in any direction to cover any size area (larger than the section itself). The different sections may also include various connectors (not shown) that are able to electrically connect the various sections to various resources (e.g. adjacent or non-adjacent sections, various supplies or control lines, etc.). Although the different sections have different fill patterns for clarity, the sections would be identical in an actual implementation.

The various layer sections 300, 400, and 800 may be complementary in shape, layout, size, etc., such that combined sections of layers 900 may fit together to cover larger areas. The sections are shaped such that the sections may be repeated in any direction to cover any size area (larger than the section itself).

In this example, each section 900 may have a two by one footprint. Different embodiments may include different sections having different specific footprints, as described below in reference to FIG. 18-FIG. 23.

Figure 18:
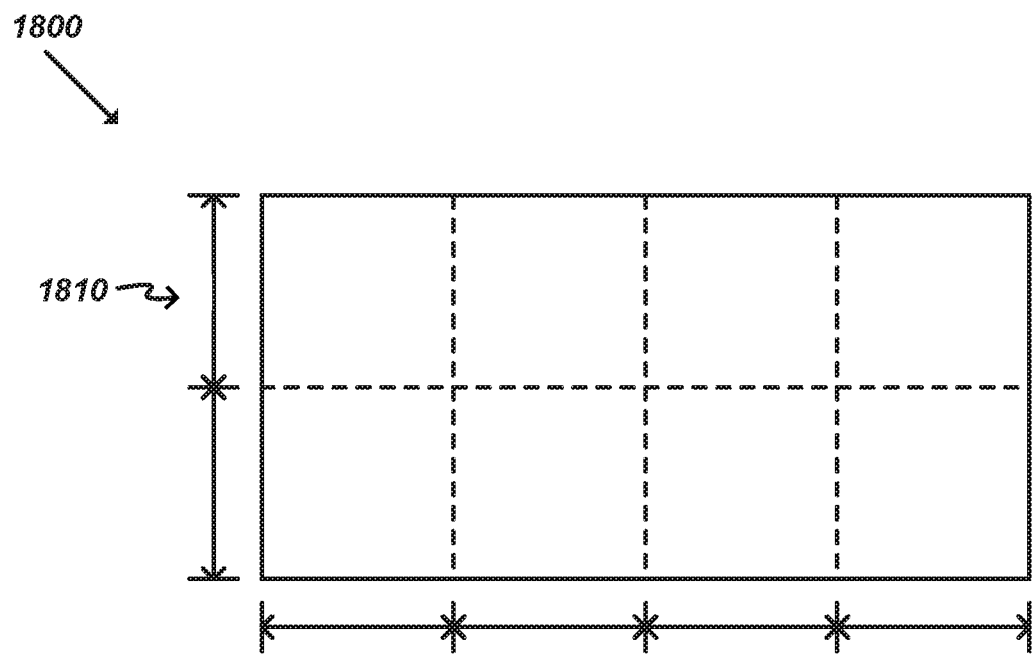
FIG. 18 illustrates a top plan view of an example transmitter area.

FIG. 18 illustrates a top plan view of an example transmitter area 1800. As shown, this area is defined as having a four unit 1810 x-dimension and a two unit y-dimension. Different areas may have irregular dimensions (i.e., non-integer ratios). Such non-integer portions may be ignored or otherwise managed. In addition, the ratios may be different than shown or described. As described in more detail in Section III below, any size or shape area may be utilized.

Figure 19:
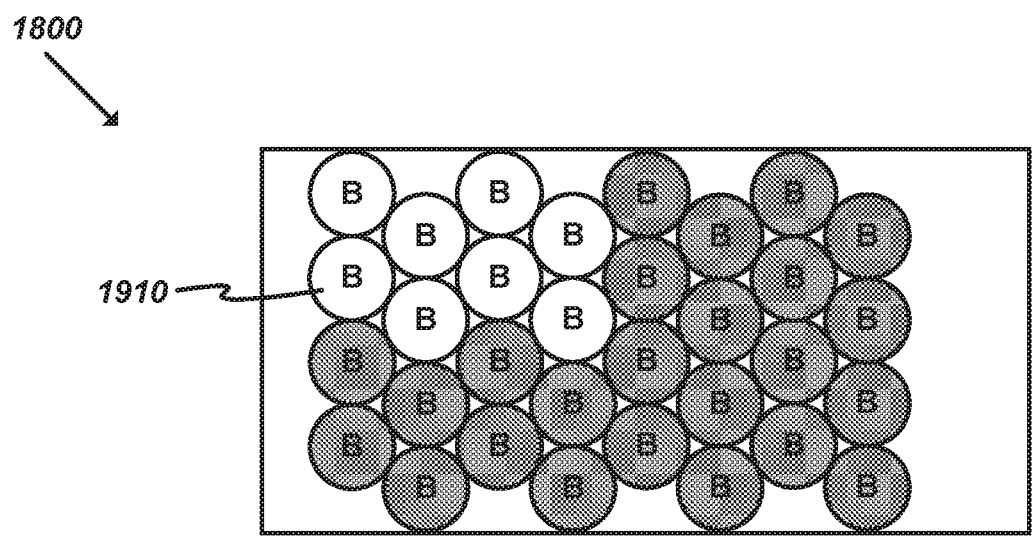
FIG. 19 illustrates a top plan view of a set of coils included in the transmitter area of FIG. 18.

FIG. 19 illustrates a top plan view of a set of coils 1910 included in the transmitter area 1800. One sub-section of coils has been highlighted with a different fill color. The sub-section in this example is the same as coil layer section 500 described above. Sections 300, 400, and 800 may be defined as two by one sections.

Figure 20:
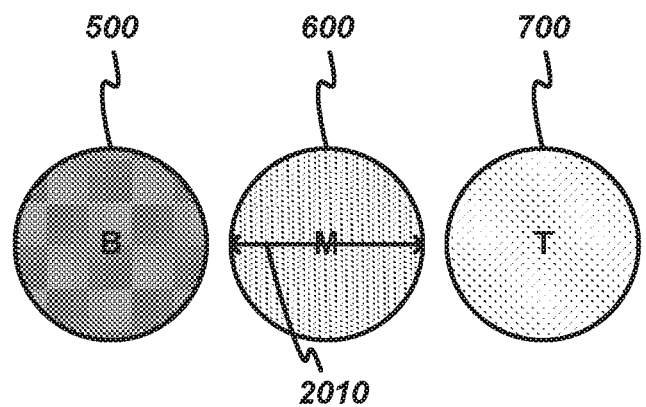
FIG. 20 illustrates a top plan view of coils included in the first, second, and third coil layers of some embodiments.

FIG. 20 illustrates a top plan view of coils included in the first 500, second 600, and third 700 coil layers of some embodiments. As shown, the coils may all be the same size as each other, with a specified radius, with corresponding diameter 2010. As shown, the coils 500, 600, and 700 may be round when viewed from above, or cylindrical when viewed from a three dimensional perspective. Of course, different embodiments may include differently sized and/or shaped coils.

Figure 21:
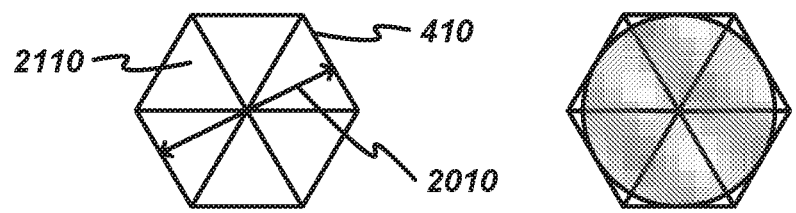
FIG. 21 illustrates a top plan view of a hexagonal layout used for the insulating layer in some embodiments.

FIG. 21 illustrates a top plan view of a hexagonal layout 410 used for the insulating layer 400 in some embodiments. As shown, the hexagon 410 may include six identically sized triangles 2110. The distance between opposite sides of the hexagon 410 may be the same (or slightly larger than) the diameter 2010, such that any coil 500, 600, or 700 may be able to fit within the hexagon 410 when viewed from the top, as shown.

Figure 22:
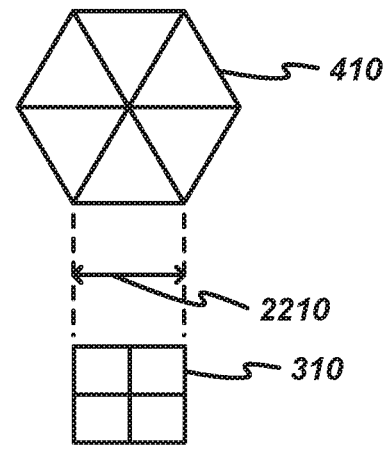
FIG. 22 illustrates a top plan view of a rectangular layout used for the processing layer in some embodiments.

FIG. 22 illustrates a top plan view of a rectangular layout 310 used for the processing layer 300 in some embodiments. As shown, the layout may be square and may have a side length 2210 that is equal to a base length of triangle 2110.

One of ordinary skill in the art will recognize that the various layers and modules described above may be implemented in various different ways without departing from the scope of the disclosure. For instance, different embodiments may have different specific layouts, additional layers (including additional coil layers, insulating layers, processing layers, and/or other appropriate layers), etc. The various layers may have various appropriate thicknesses depending on various appropriate factors (e.g., charging power, material composition, area, etc.). Furthermore, additional elements, components, and/or materials may be included. For instance, there may be various insulating materials used to space layers, fill gaps between components, etc.

III. Methods of Operation

Figure 23:
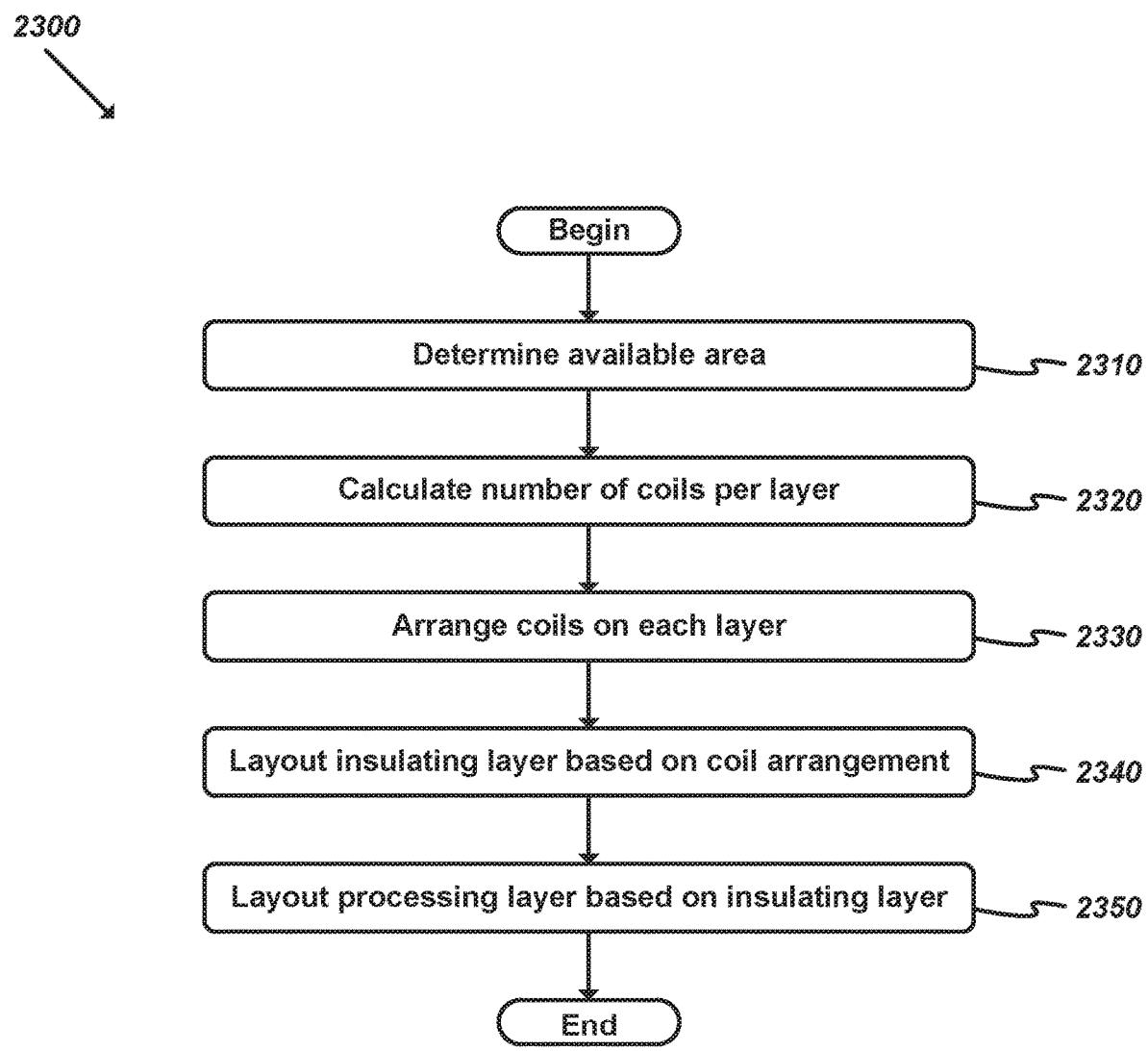
FIG. 23 illustrates a flow chart of an exemplary process that generates a transmitter layout based on an available area.

FIG. 23 illustrates a flow chart of an exemplary process 2300 that generates a transmitter layout based on an available area. The process may be executed by a computing device such as a personal computer or workstation. Such a process may begin, for instance, when a user launches a layout application of some embodiments.

As shown, the process may determine (at 2310) available area for a transmitter. The "area" refers to a two-dimensional area when viewed from above. The transmitters may have various appropriate depths allowing for components of various thicknesses. Such a determination may be made in various appropriate ways. For instance, the area may be retrieved from a layout application or data storage resource associated with a charging device. As another example, the area dimensions may be received from an administrator or designer.

Next, the process may calculate (at 2320) the number of coils per layer to be included in the transmitter using equation (1) below.

$$NC_L = 2*x*2*y \quad (1)$$

Where $NC_L$ is the number of coils per layer, x is the horizontal expansion factor and y is the vertical expansion factor (x>=1, y>=1). Thus, the total number of coils may be three times $NC_L$ for the three layer arrangement described above.

The process may then arrange (at 2330) the coils on each layer. Such arrangement may be performed in various appropriate ways. For instance, some embodiments may calculate a coil size based on the available area (which may be adjusted to account for various margins, offsets, etc.) and the number of coils per layer. The coils may then be arranged using repeating patterns as described above in reference to FIG. 14 and FIG. 15.

Next, process 2300 may lay out (at 2340) the insulating layer based on the coil arrangement. The process may then lay out (at 2350) the processing layer based on the insulating layer and then may end. The insulating layer and the processing layer may be aligned to the bottom layer of coils in some embodiments, as described above in reference to FIG. 9. The layouts of the insulating layer and the processing layer may be based on the geometric relationships described in reference to FIG. 20-FIG. 22.

Figure 24:
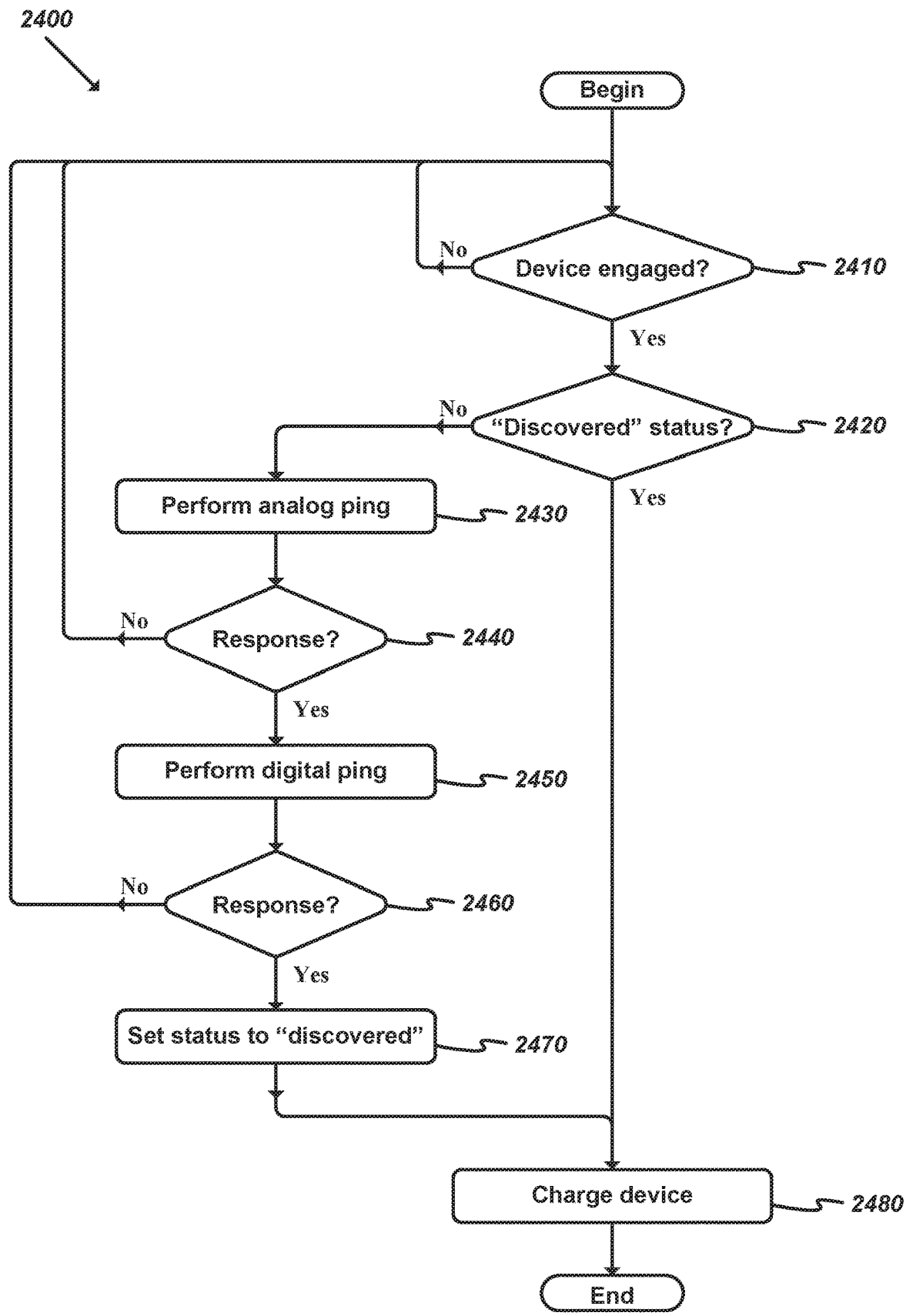
FIG. 24 illustrates a flow chart of an exemplary process that charges a user device.

FIG. 24 illustrates a flow chart of an exemplary process 2400 that charges a user device. Such a process may be executed by a charging resource of some embodiments, such as resource 120. The process may begin, for instance, when the charging resource is powered on.

As shown, the process may determine (at 2410) whether a charging device has been engaged. Such a determination may be made in various appropriate ways. For instance, a signal may be received from the device. As another example, the charging resource may periodically scan a charging surface. As another example, the charging resource may simply perform process 2400 at regular intervals whether a device is sensed or not.

If the process determines (at 2410) that no device is engaged, the process may repeat operation 2410 until the process determines (at 2410) that a device is engaged. If the process determines (at 2410) that a device is engaged, the process may then determine (at 2420) whether the device has a status of "discovered". Such a determination may be made in various appropriate ways. For instance, the charging resource may store a list of discovered devices (e.g., identified by MAC address, other unique identifier, etc.).

If the process determines (at 2420) that the device does not have discovered status, the process may perform (at 2430) an analog ping. The analog ping may be associated with the Qi standard. The analog ping may identify a list of transmitting or charging coils (from the charging resource of some embodiments) that may be associated with a charging receiver from a user device to be charged. Such association may be defined by physical positioning (e.g., if a flat charging pad is used, the list of coils associated with a receiver may include coils with a portion of a receiver above).

Next, the process may determine (at 2440) whether there was a response to the analog ping. A response message may be generated by the engaged user device in response to the analog ping. Such a response may include the list of identified coils. If the process determines (at 2440) that there was no response, the process may repeat operations 2410-2440 until the process determines (at 2440) that a response has been received.

If the process determines (at 2440) that a response has been received, the process may then perform (at 2450) a digital ping. An example of such a ping will be described in more detail in reference to process 2500 below.

Process 2400 may then determine (at 2460) whether a response to the digital ping has been received. A response may be generated by the charging resource based on the digital ping. Such a response may include a list of optimal coil sets, where each coil set may include a bottom layer coil, a middle layer coil, and a top layer coil. In some embodiments, the coil sets may include multiple complementary coils from each layer (e.g., a two-by-two array of overlapping coils from the bottom, middle, and top layers described above, a four-by-two array, etc.).

If the process determines (at 2460) that there was no response, the process may repeat operations 2410-2460 until the process determines (at 2460) that a response has been received.

If the process determines (at 2460) that an appropriate response has been received, the process may set the status of the user device to "discovered".

After setting (at 2470) the status to "discovered", or after determining (at 2420) that the status was "discovered", the process may charge (at 2480) the device and then may end. An example of such charging will be described in more detail in reference to process 2600 below.

Figure 25:
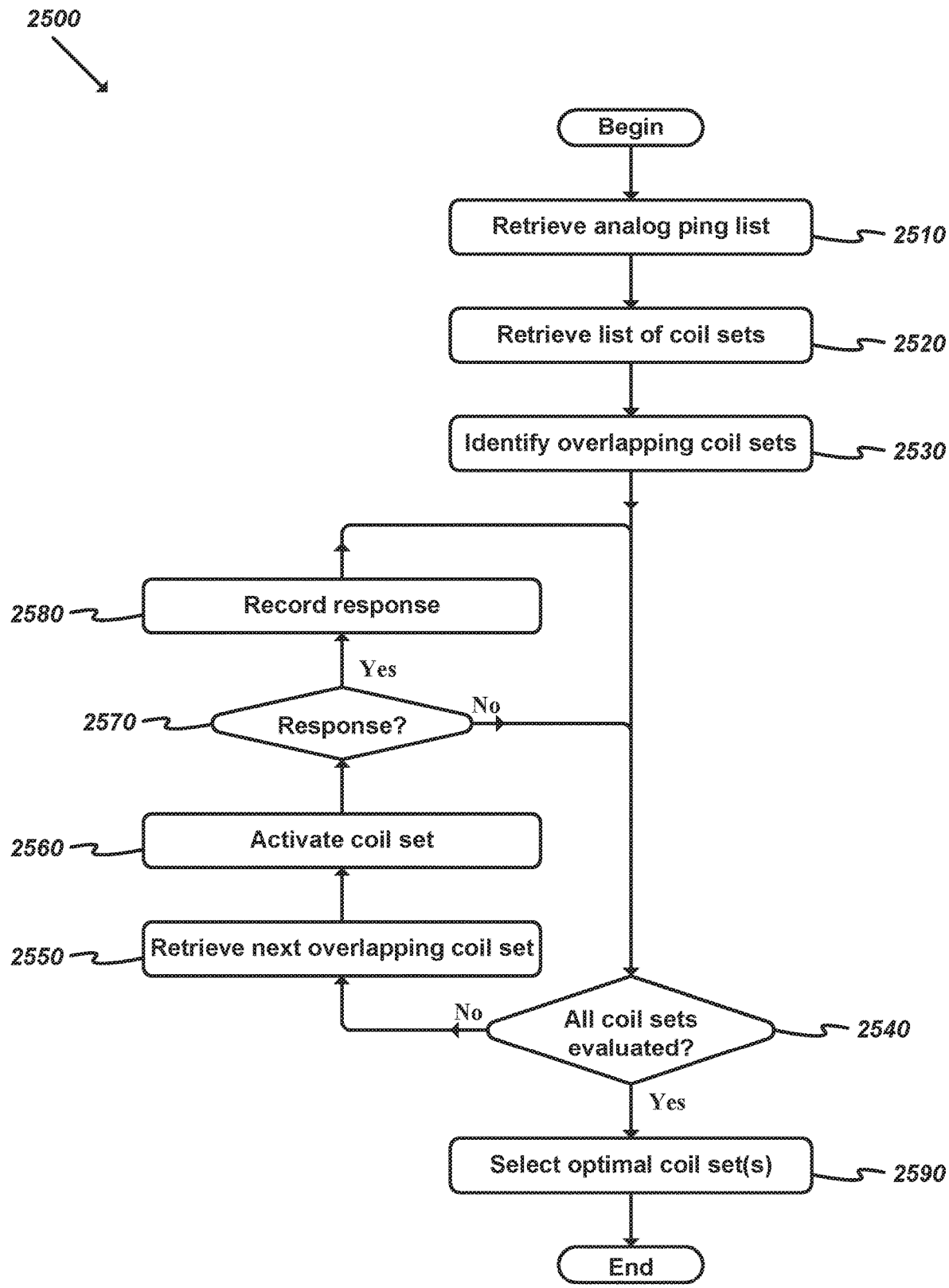
FIG. 25 illustrates a flow chart of an exemplary process that performs a digital ping to identify optimal charging coils.

FIG. 25 illustrates a flow chart of an exemplary process 2500 that performs a digital ping to identify optimal charging coils. Such a process may be executed by a charging resource of some embodiments, such as resource 120. The process may be performed as operation 2450 described above.

As shown, process 2500 may retrieve (at 2510) list of coils associated with the analog ping response (such coils may be distributed across the various coil layers). Next, the process may retrieve (at 2520) a list of available coil sets, where each coil set may include at least one coil from each layer (e.g., bottom, middle, and top layers). The process may then identify (at 2530) coil sets that overlap the list of coils and generate a list of overlapping coil sets.

Next, the process may determine (at 2540) whether all coil sets in the list of overlapping coil sets has been evaluated. If the process determines (at 2540) that not all coil sets have been evaluated, the process may retrieve (at 2550) the next coil set from the list of overlapping coil sets and activate (at 2560) the next coil set.

Process 2500 may then determine (at 2570) whether a response has been received from the user device. Such a response message may include various content elements, quality parameters (e.g., packet error rate), and/or other information. Next, the process may record (at 2580) the response.

Next, the process may determine (at 2540) whether all coil sets have been evaluated. If the process determines (at 2540) that not all coil sets have been evaluated, the process may repeat operations 2540-2580 until the process determines (at 2540) that all coil sets have been evaluated.

If the process determines (at 2540) that all coil sets have been evaluated, the process may exit the digital ping, select (at 2590) the optimal coil set(s) and then may end. Such optimal coil set(s) may be identified based on comparison of various quality parameters to various selection criteria (e.g., minimum quality threshold). In some embodiments optimal coil set(s) may be identified by sorting the coil sets by some parameter value and selecting one or more coil sets. The optimal coil set(s) may be stored in a list or other appropriate data element.

Figure 26:
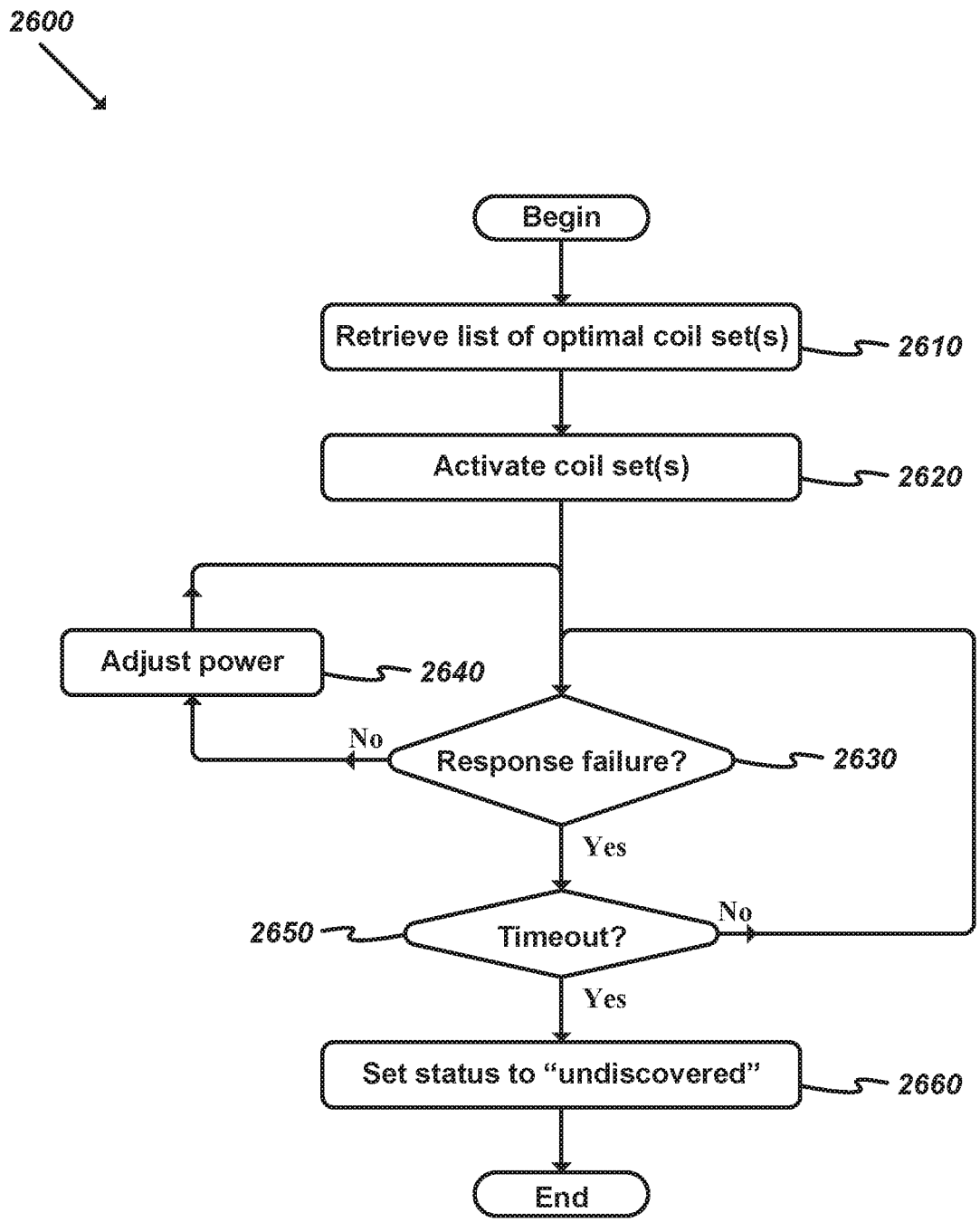
FIG. 26 illustrates a flow chart of an exemplary process that adjusts device charging parameters based on user device feedback.

FIG. 26 illustrates a flow chart of an exemplary process 2600 that adjusts device charging parameters based on user device feedback. Such a process may be executed by a charging resource of some embodiments, such as resource 120. The process may be performed as operation 2480 described above.

As shown, process 2600 may retrieve (at 2610) a list of optimal coil sets. The list may be generated using a process such as process 2500. Next, process 2600 may activate (at 2620) the coil sets from the list of optimal coil sets.

The process may then monitor the device being charged for response messages. Such messages may be sent via a wireless interface (e.g., Bluetooth, Wi-Fi, etc.) and/or through the coils themselves. The messages may include control error (CE) packet messages. The charging resource may also determine a packet error rate when decoding the CE packets. Next, the process may determine (at 2630) whether there has been a response failure. Such a response failure may include, for instance, lack of a response message, receipt of a message with inappropriate content or heading, receipt of a warning or error message (e.g., charging power too high), etc. If the process determines (at 2630) that there has not been a response failure, the process may adjust (at 2640) the charging power (and/or other charging parameters).

The power adjustment may be based on the CE packet and the calculated packet error rate. Various hardware parameters may be adjusted, including voltage, frequency, duty cycle, and phase shift, where the listed order may be the preferred level of priority. Various mobile devices may have different packet error rates. As such, the charging resource may adapt to different user device models. Some embodiments may begin with a low charging power and gradually increase the power to adapt to the requirements of each individual device. In this way, a single charging resource is able to serve various devices that may have different charging power limitations.

If the process determines (at 2630) that there has been a response failure, the process may then determine (at 2650) whether a timeout threshold has been exceeded. If the process determines (at 2650) that the threshold has not been exceeded, the process may repeat operations 2630-2650 until the process determines (at 2640) that the threshold has been exceeded. Such operations may be repeated at regular intervals that may correspond to specified messaging intervals for the device being charged.

If the process determines (at 2650) that the timeout threshold has been exceeded, the process may set (at 2660) the device status to "undiscovered" and then may end.

One of ordinary skill in the art will recognize that processes 2300-2600 are presented for exemplary purposes and may be implemented in various different ways without departing from the scope of the disclosure. For instance, the various operations may be performed in different orders. As another example, some operations may be omitted and/or other operations may be included. Each process may be divided into multiple sub-processes and/or included in a macro process. In addition, the processes (or portions thereof) may be performed iteratively and/or based on some performance criteria.

IV. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 27:
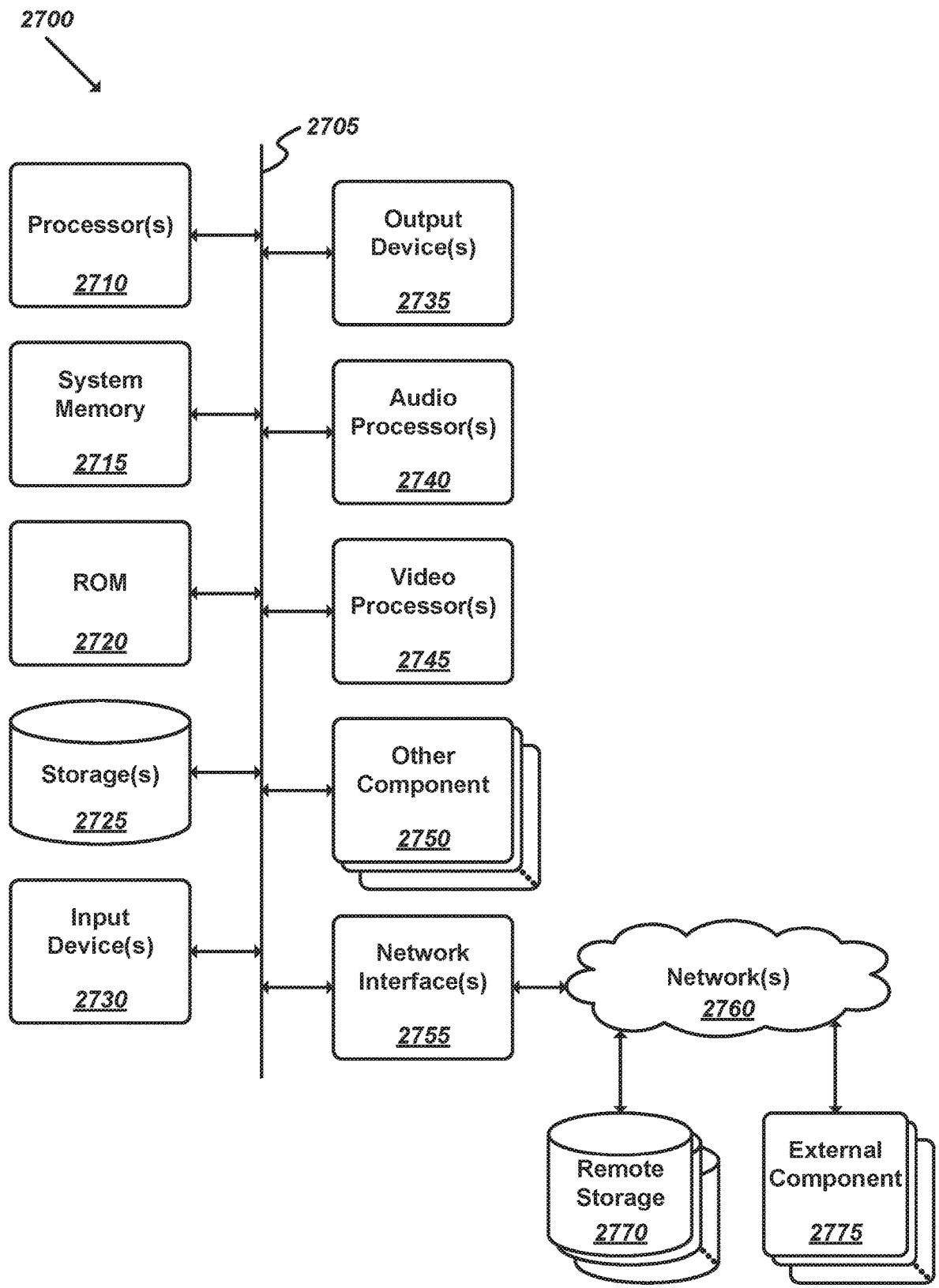
FIG. 27 illustrates a schematic block diagram of an exemplary computer system used to implement some embodiments.

FIG. 27 illustrates a schematic block diagram of an exemplary computer system 2700 used to implement some embodiments. For example, the system described above in reference to FIG. 1 may be at least partially implemented using computer system 2700. As another example, the processes described in reference to FIG. 23-FIG. 26 may be at least partially implemented using sets of instructions that are executed using computer system 2700.

Computer system 2700 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 2700 may include at least one communication bus 2705, one or more processors 2710, a system memory 2715, a read-only memory (ROM) 2720, permanent storage devices 2725, input devices 2730, output devices 2735, audio processors 2740, video processors 2745, various other components 2750, and one or more network interfaces 2755.

Bus 2705 represents all communication pathways among the elements of computer system 2700. Such pathways may include wired, wireless, optical, and/or other appropriate communication pathways. For example, input devices 2730 and/or output devices 2735 may be coupled to the system 2700 using a wireless connection protocol or system.

The processor 2710 may, in order to execute the processes of some embodiments, retrieve instructions to execute and/or data to process from components such as system memory 2715, ROM 2720, and permanent storage device 2725. Such instructions and data may be passed over bus 2705.

System memory 2715 may be a volatile read-and-write memory, such as a random access memory (RAM). The system memory may store some of the instructions and data that the processor uses at runtime. The sets of instructions and/or data used to implement some embodiments may be stored in the system memory 2715, the permanent storage device 2725, and/or the read-only memory 2720. ROM 2720 may store static data and instructions that may be used by processor 2710 and/or other elements of the computer system.

Permanent storage device 2725 may be a read-and-write memory device. The permanent storage device may be a non-volatile memory unit that stores instructions and data even when computer system 2700 is off or unpowered. Computer system 2700 may use a removable storage device and/or a remote storage device as the permanent storage device.

Input devices 2730 may enable a user to communicate information to the computer system and/or manipulate various operations of the system. The input devices may include keyboards, cursor control devices, audio input devices and/or video input devices. Output devices 2735 may include printers, displays, audio devices, etc. Some or all of the input and/or output devices may be wirelessly or optically connected to the computer system 2700.

Audio processor 2740 may process and/or generate audio data and/or instructions. The audio processor may be able to receive audio data from an input device 2730 such as a microphone. The audio processor 2740 may be able to provide audio data to output devices 2740 such as a set of speakers. The audio data may include digital information and/or analog signals. The audio processor 2740 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 2745 (or graphics processing unit) may process and/or generate video data and/or instructions. The video processor may be able to receive video data from an input device 2730 such as a camera. The video processor 2745 may be able to provide video data to an output device 2740 such as a display. The video data may include digital information and/or analog signals. The video processor 2745 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 2750 may perform various other functions including providing storage, interfacing with external systems or components, etc.

Finally, as shown in FIG. 27, computer system 2700 may include one or more network interfaces 2755 that are able to connect to one or more networks 2760. For example, computer system 2700 may be coupled to a web server on the Internet such that a web browser executing on computer system 2700 may interact with the web server as a user interacts with an interface that operates in the web browser. Computer system 2700 may be able to access one or more remote storages 2770 and one or more external components 2775 through the network interface 2755 and network 2760. The network interface(s) 2755 may include one or more application programming interfaces (APIs) that may allow the computer system 2700 to access remote systems and/or storages and also may allow remote systems and/or storages to access computer system 2700 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2700 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

I claim:

1. A wireless charging resource comprising:
   a plurality of processing elements;
   a plurality of insulating elements; and
   a plurality of coils, wherein the processing elements, insulating elements, and coils are arranged in a repeating array.

2. The wireless charging resource of claim 1, wherein the plurality of coils comprises a plurality of sets of coils, each set of coils including a first coil on a first layer, a second coil on a second layer, and a third coil on a third layer.

3. The wireless charging resource of claim 1, wherein the repeating array comprises a number of discrete interlocking sections, each discrete interlocking section comprising a set of processing elements, a set of insulating elements, and a set of coils.

4. The wireless charging resource of claim 1, wherein each coil on a first layer of coils overlaps an insulating element on an insulating layer.

5. The wireless charging resource of claim 4, wherein each coil on the first layer has a cylindrical shape with a radius, and each insulating element has a hexagonal shape with a distance between opposite sides and the radius is less than the distance.

6. The wireless charging resource of claim 1, wherein the wireless charging resource engages a user device having a charging receiver by:
   sending an analog ping to identify a list of charging coils associated with a charging receiver;
   retrieving a list of charging coil sets from among the plurality of coils;
   generating a list of charging coil sets that overlap any coil from the list of charging coils associated with the charging receiver; and
   iteratively, until all coil sets from the list of charging coil sets have been evaluated:
      selecting a next charging coil set from the list of charging coil sets;
      activating the next charging coil set; and
      recording a response from a user device associated with a charging receiver.

7. The wireless charging resource of claim 1, wherein the wireless charging resource adjusts charging power by changing at least one of voltage, frequency, duty cycle, and phase shift based on messages received from the user device.

8. A method of performing wireless charging, the method comprising:
   sending, from a charging resource, an analog ping to identify a list of charging coils associated with a charging receiver;
   sending, from the charging resource, a digital ping to identify a set of optimal charging coils; and
   activating the set of optimal charging coils in order to provide charging power to the charging receiver.

9. The method of claim 8, wherein sending the digital ping comprises:
   retrieving a list of charging coil sets;
   generating a list of charging coil sets that overlap any coil from the list of charging coils associated with the charging receiver; and
   iteratively, until all coil sets from the list of charging coil sets have been evaluated:
      selecting a next charging coil set from the list of charging coil sets;
      activating the next charging coil set; and
      recording a response from a user device associated with the charging receiver.

10. The method of claim 9, wherein sending the digital ping further comprises selecting the set of optimal transmitting coils based on the recorded responses.

11. The method of claim 9, wherein the charging coil sets are arranged in a repeating array.

12. The method of claim 8 further comprising receiving a response from a user device associated with the charging receiver and adjusting charging power based on the response.

13. The method of claim 12, wherein adjusting charging power comprises changing at least one of voltage, frequency, duty cycle, and phase shift.

14. The method of claim 8, wherein the set of optimal charging coils comprises a first coil associated with a first layer, a second coil associated with a second layer, and a third coil associated with a third layer.

15. A method of generating a layout for a wireless charging transmitter, the method comprising:
   determining an available transmitter area;
   calculating a number of coils to be included in an array;
   arranging a first set of coils including the number of coils on a first coil layer;
   arranging a second set of coils including the number of coils on a second coil layer;
   arranging a third set of coils including the number of coils on a third coil layer; and
   arranging an insulating layer to align with the first set of coils; and
   arranging a processing layer to align with the insulating layer;
   wherein the first set of coils includes a plurality of cylindrical coils, the insulating layer comprises a plurality of hexagonal insulating elements, and the processing layer comprises a plurality of rectangular processing elements.

16. The method of claim 15, wherein:
   each cylindrical coil has a same radius,
   each hexagonal insulating element has a same distance between opposite sides and the same radius is less than the same distance, and
   each rectangular element has a same side length that is equal to a side length of each hexagonal insulating element.

17. The method of claim 16, wherein the first set of coils, the second set of coils, the third set of coils, the insulating elements, and the rectangular processing elements are arranged using an array of repeating sections.

* * * * *